United States Patent
Morita et al.

(10) Patent No.: US 6,577,471 B1
(45) Date of Patent: Jun. 10, 2003

(54) MAGNETIC TAPE CARTRIDGE

(75) Inventors: Kiyoo Morita, Kanagawa-ken (JP); Daisuke Takahashi, Kanagawa-ken (JP); Hideaki Shiga, Kanagawa-ken (JP); Yusuke Ishihara, Kanagawa-ken (JP); Seiji Tsuyuki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/744,094

(22) PCT Filed: May 7, 1999

(86) PCT No.: PCT/JP99/02373

§ 371 (c)(1),
(2), (4) Date: Jan. 15, 2001

(87) PCT Pub. No.: WO00/04547

PCT Pub. Date: Jan. 27, 2000

(30) Foreign Application Priority Data

Jul. 17, 1998 (JP) .................................. 10-202499

(51) Int. Cl.⁷ .............................................. G11B 23/07
(52) U.S. Cl. ....................................................... 360/132
(58) Field of Search ........................ 360/132; 242/348, 242/348.1, 348.2, 348.3, 348.4

(56) References Cited

U.S. PATENT DOCUMENTS

| | | | | |
|---|---|---|---|---|
| 6,097,574 A | * | 8/2000 | Morita et al. ............... | 360/132 |
| 6,299,088 B1 | * | 10/2001 | Rambosek ................... | 360/132 |
| 6,304,416 B1 | * | 10/2001 | McAllister et al. ......... | 360/132 |
| 6,452,745 B1 | * | 9/2002 | Shiga et al. ................. | 360/132 |
| 6,481,658 B1 | * | 11/2002 | Shiga et al. ................. | 242/348 |

FOREIGN PATENT DOCUMENTS

| | | |
|---|---|---|
| JP | 56-140973 | 10/1981 |
| JP | 56-140974 | 10/1981 |
| JP | 5-325493 | 12/1993 |
| JP | 6-302149 | 10/1994 |
| JP | 7-85630 | 3/1995 |
| JP | 8-147803 | 6/1996 |
| JP | 9-265759 | 10/1997 |
| JP | 10-172262 | 2/1998 |

* cited by examiner

*Primary Examiner*—Robert S. Tupper
(74) *Attorney, Agent, or Firm*—Sughrue Mion, PLLC

(57) ABSTRACT

In a magnetic tape cartridge comprising a magnetic tape wound around a single reel and a substantially rectangular cartridge casing which is formed by fastening upper and lower casing halves by a fastener means and in which the reel is housed for rotation, a tape draw-out opening is provided in a corner of the cartridge casing, and a non-contact memory element is provided in at least one of the other three corner portions in the lower casing half.

14 Claims, 6 Drawing Sheets

MAGNETIC TAPE CARTRIDGE

FIELD OF THE INVENTION

This invention relates to a magnetic tape cartridge, and more particularly to a magnetic tape cartridge comprising a cartridge casing and a single reel which is housed in the cartridge casing for rotation and around which a magnetic tape is wound.

BACKGROUND OF THE INVENTION

As a recording medium for use in an external memory of a computer or the like, there has been known a magnetic tape cartridge comprising a magnetic tape wound around a single reel and a cartridge casing in which the reel is housed for rotation. Since the magnetic tape is used for storing data in a computer or the like and important information is stored on the magnetic tape, the magnetic tape cartridge is structured so that trouble such as tape jam does not occur and the magnetic tape is not accidentally drawn out.

There has been known a magnetic tape cartridge provided with a memory element other than the magnetic tape so that the contents of the information recorded on the magnetic tape, the kind of the magnetic tape and the like can be detected from the memory element without reading out the information from the magnetic tape. The memory element generally comprises a semiconductor chip on which the contents or the like of the information recorded on the magnetic tape are recorded by a non-contact system such as an electromagnetic induction system and the information recorded on which is read out by a non-contact system such as an electromagnetic induction system.

It is necessary that the memory element is disposed in a position on the surface of the magnetic tape cartridge or inside the magnetic tape cartridge where the memory element does not interfere with the reel. Further, it is necessary that the memory element is disposed in a position where information read-out systems can have access to the memory element so that the information stored therein can be easily read out by an external memory means, a magnetic tape cartridge take out means which takes out a selected magnetic tape cartridge in a library where a plurality of magnetic tape cartridges are stored, or the like.

The cartridge casing is formed by fastening together rectangular upper and lower casing halves at their four corners by metal screws. When the metal screws are of iron, read and write of information from and on the memory element can be adversely affected.

In view of the foregoing observations and description, the primary object of the present invention is to provide a magnetic tape cartridge in which the memory element is disposed in a position where information read-out systems can easily gain access to the memory element.

Another object of the present invention is to provide a magnetic tape cartridge in which the upper and lower casing halves are fastened together by a fastening structure which cannot adversely affect read and write of information from and on the memory element.

SUMMARY OF THE INVENTION

In accordance with a first aspect of the present invention, there is provided a magnetic tape cartridge comprising a magnetic tape wound around a single reel and a substantially rectangular cartridge casing which is formed by fastening upper and lower casing halves by a fastener means and in which the reel is housed for rotation, wherein the improvement comprises that a non-contact memory element is provided in at least one of the four corner portions of the lower casing half.

In the case where a tape draw-out opening is provided in a corner of the cartridge casing, a non-contact memory element is provided in at least one of the other three corner portions.

The non-contact memory element is a memory element on which information can be recorded by a non-contact system such as an electromagnetic induction system and information recorded on which can be read out by a non-contact system such as an electromagnetic induction system. It is preferred that the memory element be square in shape from the viewpoint of mounting facility.

It is preferred that the memory element be held at about 45° to the bottom surface of the cartridge casing. So long as the memory element is held at about 45° to the bottom surface of the cartridge casing, the memory element may be held by any holding means. For example, the memory element holding means may comprise a recess which is formed in the lower casing to receive a lower edge of the memory element and a recess which is formed in the upper casing to receive an upper edge of the memory element, or may comprise a holding portion which is formed in the lower casing half to be engaged with a lower portion of the side edges of the memory element and a holding portion which is formed in the upper casing half to hold an upper portion of the side edges of the memory element. Ribs for reinforcing the upper and lower casing halves may be used to hold the memory element.

The expression "the memory element is held at about 45° C. to the bottom surface of the cartridge casing" means that the memory element need not be held strictly at 45° C. to the bottom surface of the cartridge casing so long as the memory element is held to the bottom surface of the cartridge casing at an angle at which information stored in the memory element can be read by a non-contact system in both a recording and reproducing apparatus and a library as will be described in more detail later.

A tape draw-out opening through the magnetic tape in the cartridge casing is drawn out is generally formed in a side wall at one of two front corners (leading corners as seen in the direction of insertion of the magnetic tape cartridge into a recording and reproducing apparatus). The expression "in the case where a tape draw-out opening is provided in a corner of the cartridge casing, a non-contact memory element is provided in at least one of the other three corner portions" means that the non-contact memory element is provided in at least one of the other of the front corner portions and the two rear corner portions. For example, one non-contact memory element may be provided in each of one front corner portion and one rear corner portion. The "corner portion" means a space formed between the corner of the lower casing half of the cartridge casing, formed by a pair of side walls normal to each other, and the outer peripheral surface of the reel.

It is preferred that the upper and lower casing halves be formed of a non-magnetic material and the fastener means near the non-contact memory element be formed of a non-magnetic material. For example, the fastener means near the non-contact memory element may comprise a screw formed of a hard plastic material and a boss which is formed on the upper or lower casing half and in which a sleeve of a soft plastic material is fitted so that a front end portion of the screw is screwed into the sleeve in a self-tapping fashion. In this case, it is preferred that the outer surface of the sleeve and the inner surface of the boss facing each other at the interface therebetween be serrated.

Further, the fastener means near the non-contact memory element may comprise bosses which are formed respectively on the top wall of the upper casing half to extend downward and on the bottom wall of the lower casing half to extend upward and are bonded together at their ends by adhesive or welding.

Further, the fastener means near the non-contact memory element may double as the memory element holding means in the lower casing half. In this case, the fastener means may comprise a pair of resilient engagement pieces which are formed on the inner side of the side wall of the upper casing half to extend inward downward laterally spaced from each other and are adapted to be engaged with the inner side of the side wall of the lower casing half, and the memory element is held by the resilient engagement pieces.

When the magnetic tape cartridge is loaded in the recording and reproducing apparatus, the magnetic tape cartridge is generally held at a level lower than the level at which the magnetic tape cartridge is inserted into the apparatus. When the non-contact memory element is disposed in the upper casing half, the distance between the memory element and the information read/write means of the recording and reproducing apparatus becomes large, which is disadvantageous in view of stably effecting read and write of information. In accordance with the present invention, since the memory element is disposed in the lower casing half, the distance between the memory element and the information read/write means of the recording and reproducing apparatus becomes small and read and write of information can be stably effected.

When the memory element is disposed in one of the rear corner portions, information recorded on the memory element can be read from behind, and accordingly, the magnetic tape cartridge can be stored in a library in the same position as the position in which the magnetic tape cartridge is loaded in a recording and reproducing apparatus.

When the memory element is held at about 45° C. to the bottom surface of the cartridge casing, the information read/write means can face the surface of the memory element at 45° C. both from below and from front and the information read/write means may be positioned either below the magnetic tape cartridge or in front of the same, whereby the degree of freedom in disposing the information read/write means is increased, which results in a higher degree of freedom in designing the recording and reproducing apparatus.

The cartridge casing is formed by fastening together rectangular upper and lower casing halves at their four corners by screws. When the metal screws are of iron, read and write of information from and on the memory element can be adversely affected by the magnetic material disposed near the memory element. In accordance with the present invention, by forming the fastener means near the memory means of a non-magnetic material, the aforesaid problem can be easily overcome.

PREFERRED EMBODIMENTS OF THE INVENTION

Embodiments of the present invention will be described with reference to the drawings, hereinbelow.

Figure 1:
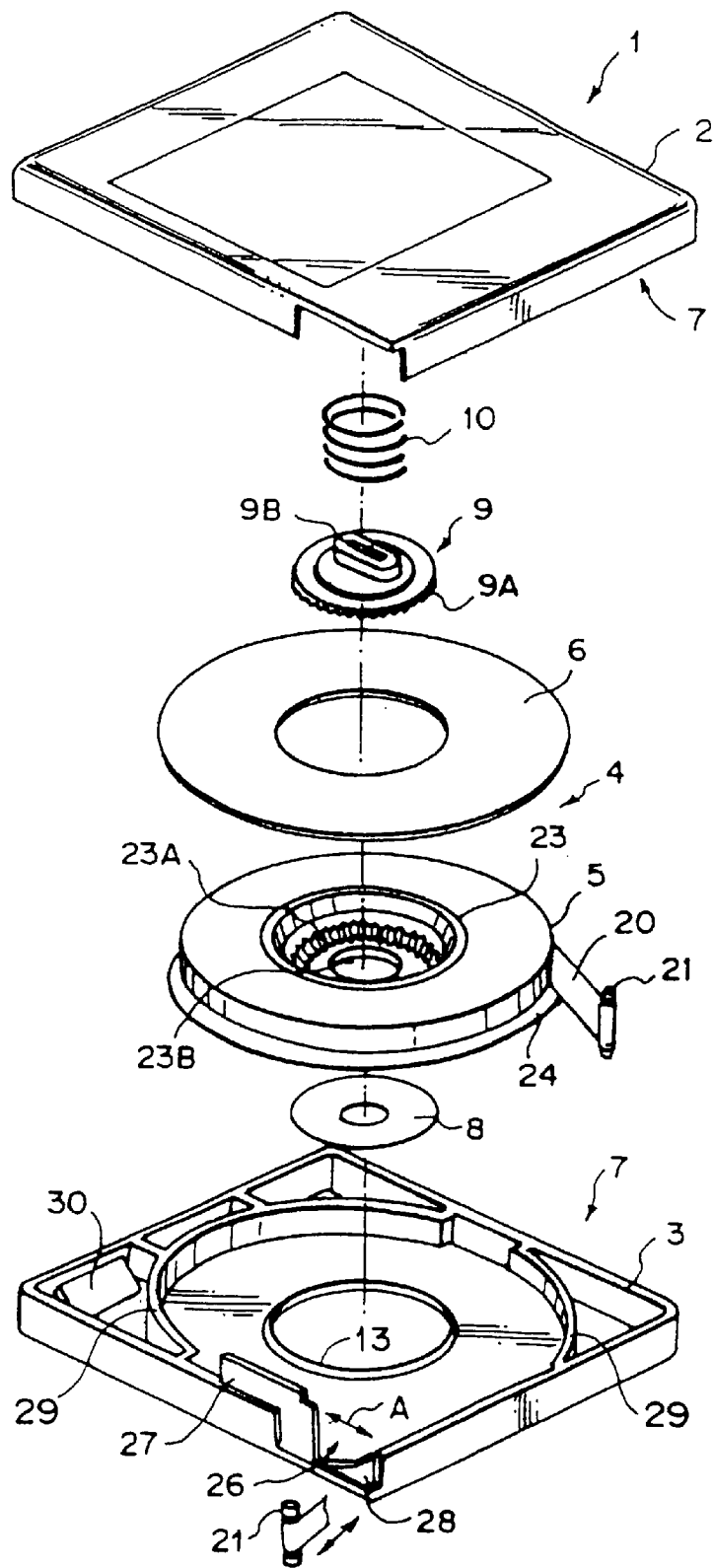
FIG. 1 is an exploded perspective view showing a magnetic tape cartridge in accordance with an embodiment of the present invention.

FIG. 1 is an exploded perspective view showing a magnetic tape cartridge in accordance with an embodiment of the present invention.

As shown in FIG. 1, the magnetic tape cartridge 1 comprises a flat rectangular cartridge casing 7 of hard plastic which is formed by fastening together upper and lower casing halves 2 and 3, which are rectangular in plan, by fasteners such as screws at their four corners, and a single reel 4 around which magnetic tape 20 is wound is housed for rotation in the cartridge casing 7. A circular opening 13 is formed at the center of the bottom wall of the lower casing half 3, and circular ribs 29 are formed on the inner surfaces of the upper and lower casing halves 2 and 3 (only the rib 29 on the lower casing half 3 is shown in FIG. 1) to coaxially surround the reel 4.

The reel 4 comprises a lower reel 5 and an upper reel 6 bonded together, for instance, by ultrasonic welding. The lower reel 5 comprises a cylindrical reel hub 23 around which the magnetic tape 20 is wound and a flange portion 24 extending radially outward from the outer periphery of the lower end of the lower reel 5. The reel hub 23 and the flange portion 24 are integrally formed by synthetic resin molding. A reel plate 8 which attracts and holds a magnetic reel drive means for driving the reel 4 is mounted on the lower surface of the bottom of the reel hub 23. Further a braking gear 23A which is brought into mesh with a braking gear 9A formed on a brake button 9 and prevents rotation of the reel 4 when the magnetic tape cartridge is not being used is formed on the upper surface of the bottom of the reel hub 23. Further, the reel hub 23 is provided with an opening 23B through which a release spindle of a recording and reproducing apparatus in which the magnetic tape cartridge 1 is loaded, e.g., an external memory, is inserted to lift the brake button 9.

The brake button 9 is provided with the braking gear 9A on the side opposed to the reel hub 23 and with a groove 9B on the opposite side. A brake guide projection formed on the upper casing half 2 is fitted in the groove 9B. The brake button 9 is incorporated in the reel hub 23 urged downward by a coiled spring 10 so that the braking gear 9A of the brake button 9 is in mesh with the braking gear 23A of the reel hub 23 to prevent rotation of the reel 4 when the magnetic tape cartridge 1 is not being used. When the magnetic tape cartridge 1 is to be used, the release spindle of the recording and reproducing apparatus lifts upward the brake button 9 overcoming the force of the coiled spring 10 to disengage the braking gears 9A and 23A from each other, whereby the reel 4 is released to be freely rotated.

A tape draw-out opening 26 through which the magnetic tape 20 is drawn out is formed in one side face of the cartridge casing 7. A sliding door 27 for opening and closing the tape draw-out opening 26 is mounted in the cartridge casing 7 to be slidable back and forth in the direction of arrow A parallel to the side wall of the cartridge casing 7 between a closing position where it closes the tape draw-out opening 26 and opening position where it opens the same. The sliding door 27 is urged toward the closing position and held there by a door spring (not shown).

When the magnetic tape cartridge 1 is not being used, a leader pin 21 fixed to the leading end of the magnetic tape 20 (a member which is caught by the recording and reproducing apparatus in order to introduce the magnetic tape 20 into the tape running path in the apparatus) is held in a leader pin holding recess 28 formed near the tape draw-out opening 26 with the magnetic tape 20 fully taken up around the reel 4.

When the magnetic tape cartridge 1 is loaded in a recording and reproducing apparatus, the braking gears 9A and 23A of the brake button 9 and the reel hub 23 are disengaged from each other to permit rotation of the reel 4 as described above, and the magnetic reel drive means attracts the reel plate 8 and rotates the reel 4. Further the sliding door 27 is opened and the leader pin 21 is moved to a predetermined position on the tape running path, whereby the magnetic tape 20 is set in the recording and reproducing apparatus so that data can be recorded on or read out from the magnetic tape 20.

A non-contact memory element 30 on which the contents or the like of the information recorded on the magnetic tape 20 are recorded by a non-contact system such as an electromagnetic induction system and the information recorded on which is read out by a non-contact system such as an electromagnetic induction system is held in a corner portion of the lower casing half 3 of the cartridge casing 7. The memory element 30 is a rectangular plate-like member.

Figure 2:
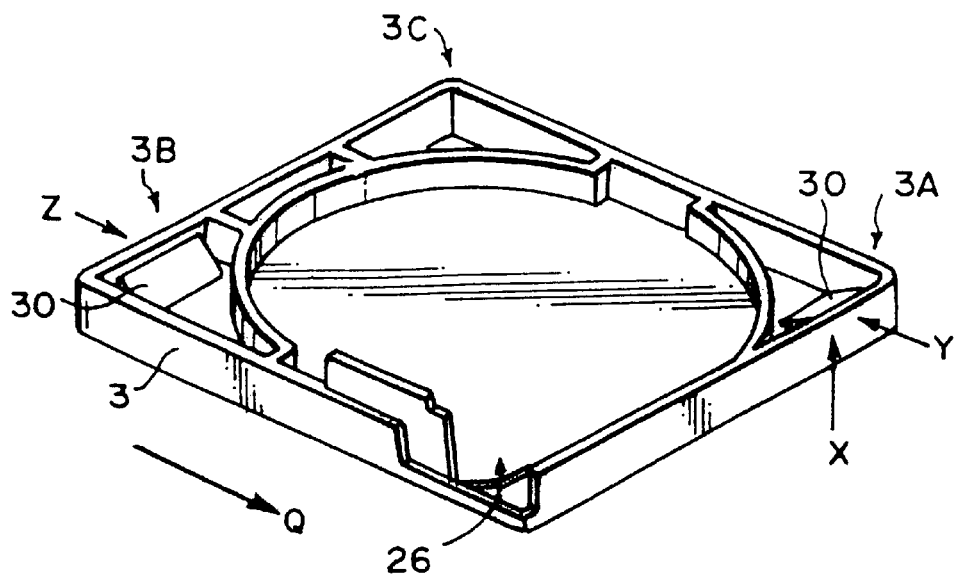
FIG. 2 is a perspective view of the lower casing half for illustrating the disposition of the memory element in the cartridge casing shown in FIG. 1.
Figure 3:
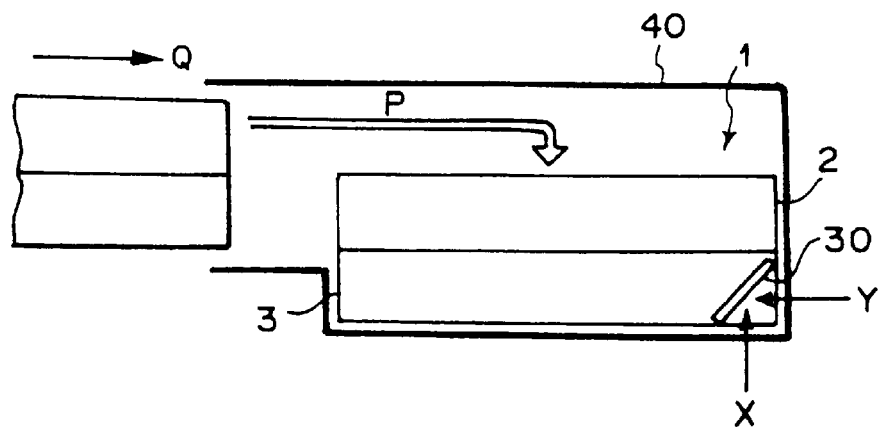
FIG. 3 is a cross-sectional view showing a state in which the magnetic tape cartridge is loaded in a recording and reproducing apparatus.

FIG. 2 is a perspective view of the lower casing half for illustrating the disposition of the memory element in the cartridge casing shown in FIG. 1, and FIG. 3 is a cross-sectional view showing a state in which the magnetic tape cartridge is loaded in a recording and reproducing apparatus.

As shown in FIG. 3, when the magnetic tape cartridge 1 is loaded in the recording and reproducing apparatus 40, the magnetic tape cartridge 1 is held at a level lower than the level at which the magnetic tape cartridge 1 is inserted into the apparatus 40 (arrow P). Information which has been recorded on the memory element 30 is read by the recording and reproducing apparatus 40 by a non-contact system such as electromagnetic induction and additional information is recorded on the memory element by the non-contact system.

As shown in FIG. 2, the memory element 30 may be disposed in any one of three corner portions 3A, 3B and 3C out of the four corner portions in the lower casing half 3 except the corner portion at which the tape draw-out opening 26 is formed. Since the magnetic tape cartridge 1 is held in a position at a level lower than the level at which the magnetic tape cartridge 1 is inserted into the apparatus 40 as shown in FIG. 3, if the memory element 30 is disposed in the upper casing half 2, the distance between the memory element 30 and the information read/write means of the recording and reproducing apparatus 40 becomes too large in the case where the information recorded on the memory element 30 is read out from below the magnetic tape cartridge 1 in the direction of arrow X.

The corner portion 3A is a front corner as seen in the direction of insertion Q of the magnetic tape cartridge 1 into the recording and reproducing apparatus 40, and when the memory element 30 is disposed in the corner portion 3A, information can be recorded on and read out from the memory element 30 in both the directions of arrows X and Y, whereby the degree of freedom in disposing the information read/write means is increased, which results in a higher degree of freedom in designing the recording and reproducing apparatus 40.

The corner portions 3B and 3C are rear corner portions as seen in the direction of insertion Q of the magnetic tape cartridge 1 into the recording and reproducing apparatus 40, and it is preferred, for a library where the information recorded on the memory element 30 is read in the direction of arrow Z, that the memory element 30 be disposed in one of the corner portions 3B and 3C.

Figure 4:
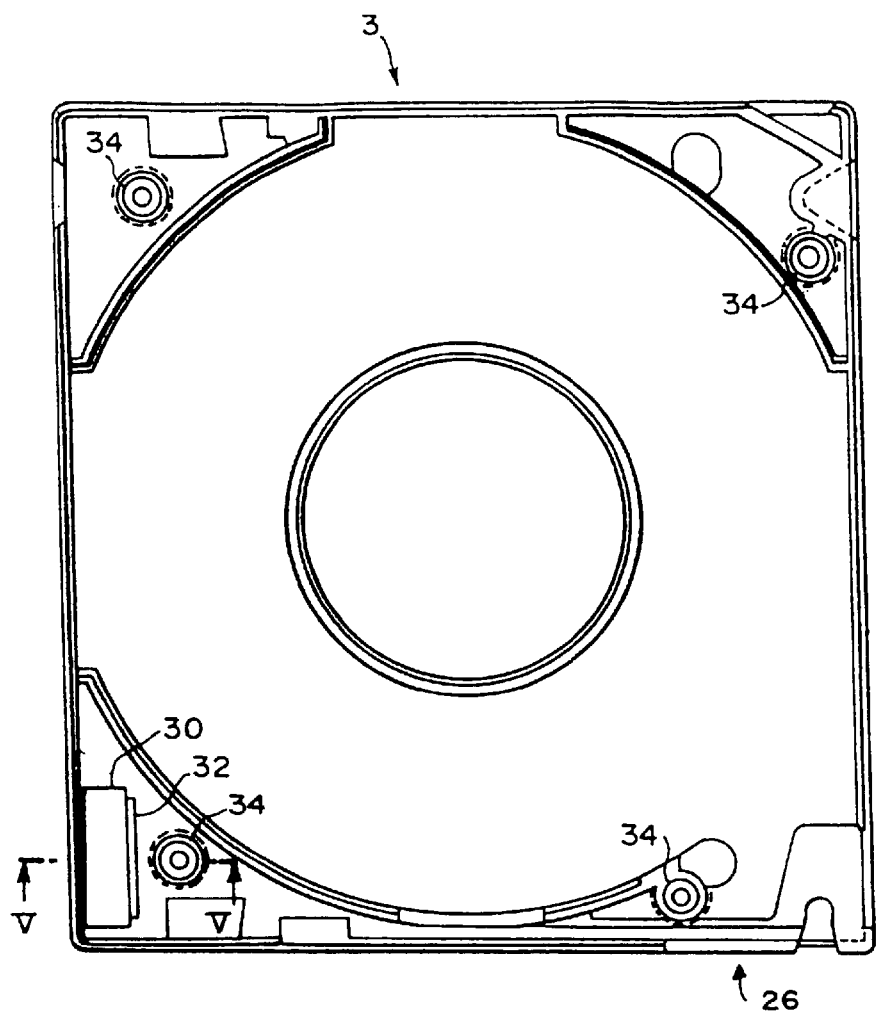
FIG. 4 is a plan view of the lower casing half for illustrating the disposition of the memory element and the fastener means for fastening the upper and lower casing halves.
Figure 5:
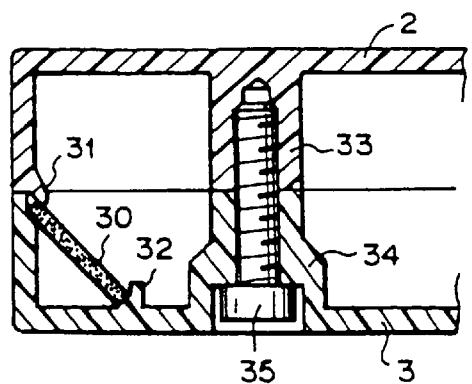
FIG. 5 is an enlarged cross-sectional view taken along line V—V in FIG. 4 showing an example of the memory element holding structure and the fastener means.

FIG. 4 is a plan view of the lower casing half for illustrating the disposition of the memory element and the fastener means for fastening the upper and lower casing halves, and FIG. 5 is an enlarged cross-sectional view taken along line V—V in FIG. 4 showing an example of the memory element holding structure and the fastener means.

The memory element 30 is a square plate-like member and is held by a support portion 31 formed on the inner side of the side wall of the upper casing halve 2 to support the upper edge of the memory element 30 and a support portion 32 formed on the inner side of the bottom wall of the lower casing halve 3 to support the lower edge of the memory element 30 as shown in FIG. 5. It is preferred that the memory element 30 be held so that the upper surface of the memory element 30 is at about 45° C. to the bottom surface of the lower casing half 3 as shown in FIG. 5, whereby the information read/write means of the recording and reproducing apparatus 40 can easily record information on the memory element 30 or easily read out information from the memory element 30.

Fastening of the upper and lower casing halves 2 and 3 will be described, hereinbelow. As shown in FIG. 4, a cylindrical boss 34 is erected from the bottom wall of the lower casing half 3 at each corner of the lower casing half 3 and a boss 33 is erected from the inner surface of the top wall of the upper casing half 2 at each corner of the upper casing half 2. The upper and lower casing halves 2 and 3 are mated together with the bosses 33 and 34 butting against each other and screws 35 for fastening the upper casing half 2 to the lower casing half 3 are inserted into the bosses 34 from the bottom surface of the lower casing half 3 with a front end portions of the screws 35 screwed in a self-tapping fashion into blind holes in the bosses 33. At least one of the four screws 35 which is near the memory element 30 is formed of a non-magnetic material such as ceramic, non-magnetic metal, non-magnetic amorphous metal or the like.

Figure 6A:
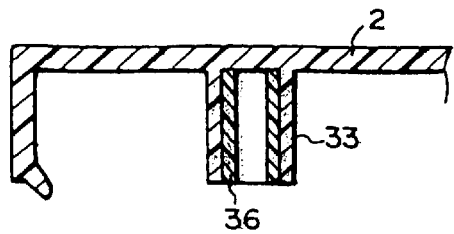
FIG. 6A is a vertical cross-sectional view showing a modification of the upper casing half shown in FIG. 5.
Figure 6B:
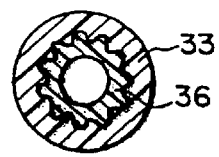
FIG. 6B is an enlarged vertical cross-sectional view of the boss employed in the modification.

The non-magnetic screw 35 may be formed of hard plastic similar to that of which the cartridge casing 7 is formed. In this case, it is preferred that the bosses 33 of the upper casing half 2 be molded with a sleeve 36 of a soft plastic material embedded therein as shown in FIG. 6A, whereby a front end portion of the screw 35 can be screwed into the boss 33 in a self-tapping fashion. In this case, it is preferred that the outer surface of the sleeve 36 and the inner surface of the boss 33 facing each other at the interface there between be serrated as shown in FIG. 6B in order to prevent the sleeve 36 from dropping from the boss 33 and from rotating relative to the boss 33.

Figure 7:
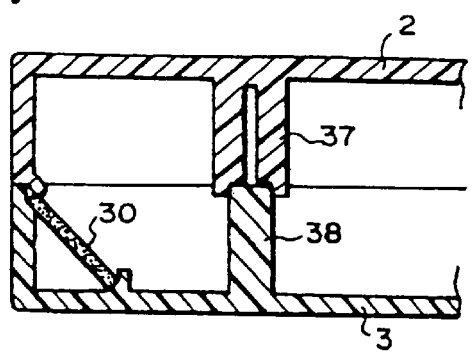
FIG. 7 is a fragmentary vertical cross-sectional view showing another example of the fastener means for fastening the upper and lower casing halves.

FIG. 7 is a view similar to FIG. 5 but showing another example of the fastener means for fastening the upper and lower casing halves.

In the structure shown in FIG. 7, the upper and lower casing halves 2 and 3 are fastened by integrally forming bosses 37 and 38 respectively on the top wall of the upper casing half 2 to extend downward and on the bottom wall of the lower casing half 3 to extend upward and bonding the bosses 37 and 38 together at their ends by adhesive or welding.

Figure 8:
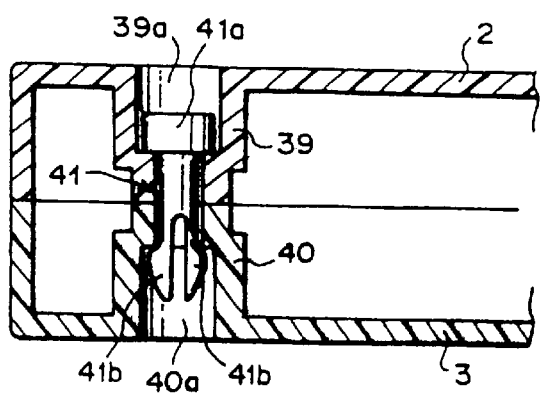
FIG. 8 is a fragmentary vertical cross-sectional view showing still another example of the fastener means for fastening the upper and lower casing halves.

Further, the upper and lower casing halves 2 and 3 may be fastened together by resilient engagement near the memory element 30. That is, in the arrangement shown in FIG. 8, the upper and lower casing halves 2 and 3 are fastened together by a resilient plastic fastener 41 in place of the screw 35.

In this arrangement, the upper and lower casing halves 2 and 3 are provided with bosses 39 and 40 formed respectively on the top wall of the upper casing half 2 to extend downward and on the bottom wall of the lower casing half 3 to extend upward. The bosses 39 and 40 are provided with through holes 39a and 40a respectively having shoulders, and the bosses 39 and 40 are positioned so that the through holes 39a and 40a are aligned with each other when the upper and lower casing halves 2 and 3 are mated. The fastener 41 comprises a head 41a which adapted to be engaged with the shoulder of the through hole 39a in the boss 39 and a tip end portion bifurcated into a pair of resilient pieces 41b which are adapted to be resiliently engaged with the shoulder of the through hole 40a in the boss 40. The upper and lower casing halves 2 and 3 are fastened together by inserting the fastener 41 into the through hole 39a until the resilient pieces 41b are resiliently engaged with the shoulder of the through hole 40a in the boss 40.

Figure 9A:
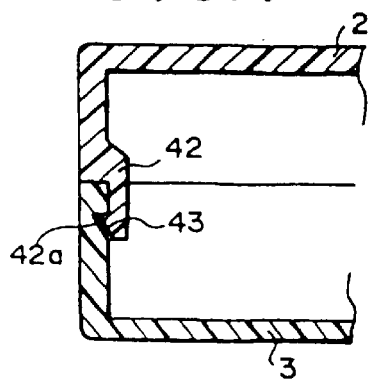
FIGS. 9A and 9B are fragmentary vertical cross-sectional views showing examples of the engagement portions of the side walls of the upper and lower casing halves.
Figure 9B:
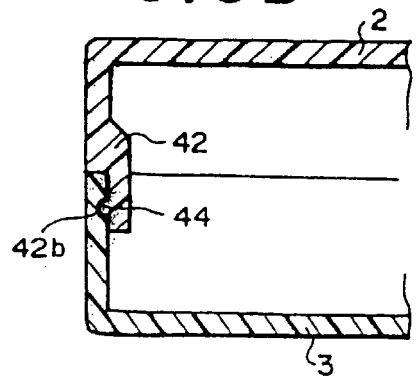

In the arrangements shown in FIGS. 9A and 9B, the upper and lower casing halves 2 and 3 are fastened together by bringing the side walls into resilient engagement with each other. That is, in the arrangement shown in FIG. 9A, a resilient engagement piece 42 having a hook portion 42a at its free end is formed on the side wall of the upper casing half to extend inward downward near the memory element 30 and a notch 43 which is triangular in cross-section and is adapted to be resiliently engaged with the hook portion 42a is formed on the inner side of the side wall of the lower casing half 3. When the resilient engagement piece 42 is provided with a semi-spherical projection 42b in place of the hook portion 42a and the lower casing half 3 is provided with a semi-spherical recess 44 in place of the notch 43 as shown in FIG. 9B, the mold for molding the cartridge casing 7 may be simple in structure and the molded products can be ejected from the mold more easily.

Figure 10:
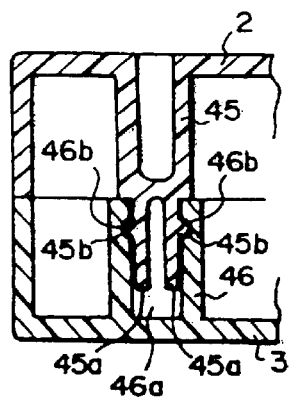
FIG. 10 is a fragmentary vertical cross-sectional view showing still another example of the fastener means for fastening the upper and lower casing halves.

In the arrangement shown in FIG. 10, a pair of opposed resilient engagement pieces 45a respectively having engagement projections 45b on their outer sides are formed on the end face of a boss 45 erected on the inner side of the top wall of the upper casing half 2, and a hole 46a is formed in a boss 46 erected on the inner side of the bottom wall of the lower casing half 3. The hole 46a is provided with engagement recesses 46b, and when the resilient engagement pieces 45a are inserted into the hole 46 until the engagement projections 45b are engaged with the engagement recesses 46b, the upper and lower casing halves 2 and 3 are fastened together.

Figure 11:
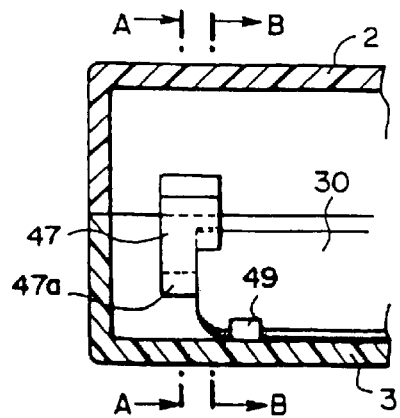
FIG. 11 is a fragmentary vertical cross-sectional view showing the memory element holding portion.
Figure 12A:
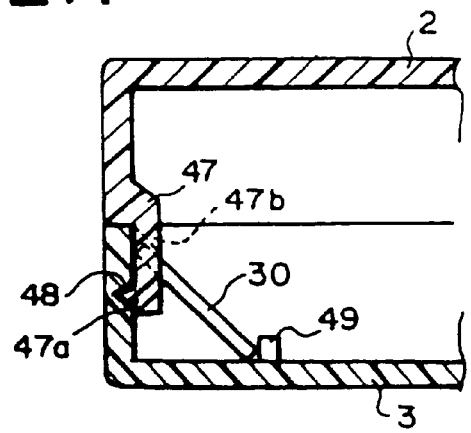
FIGS. 12A and 12B are cross-sectional views respectively taken along lines A—A and B—B.
Figure 12B:
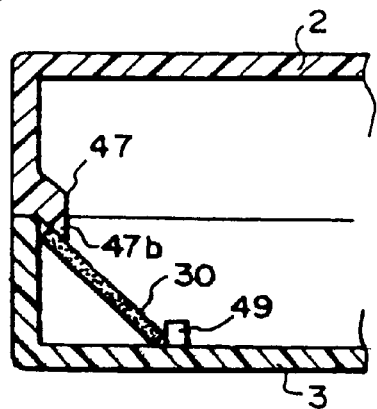

In the arrangement shown in FIGS. 11, 12A and 12B (FIGS. 12A and 12B being cross-sectional views taken along lines A—A and B—B in FIG. 11), a pair of resilient engagement pieces 47 are formed on the inner side of the side wall of the upper casing half 2 to extend inward downward laterally spaced from each other (only one of the resilient engagement pieces 47 is seen in FIG. 11), and the resilient engagement pieces 47 are used both for fastening the upper and lower casing halves 2 and 3 and holding the upper edge and side edges of the memory element 30.

That is, each of the resilient engagement pieces 47 supports a side edge of the memory element 30, and a hook portion 47a on the free end of the resilient engagement member 47 is resiliently engaged with a notch 48 formed on the inner side of the side wall of the lower casing half 3, thereby fastening together the upper and lower casing halves 2 and 3. Further, a projection 47b formed at the base of each resilient engagement piece 47 supports the upper edge of the memory element 30. The lower edge of the memory element 30 is supported by a pair of support portions 49 (only one of them is shown in FIG. 11) formed on the inner side of the bottom wall of the lower casing half 3.

As can be understood from the description above, when the fastener for fastening the upper and lower casing halves 2 and 3 near the memory element 30 is formed of a non-magnetic material, the fastener do not adversely affect read and write of information from and on the memory element 30.

What is claimed is:

1. A magnetic tape cartridge comprising:
    a magnetic tape wound around a single reel;
    a substantially rectangular cartridge casing comprising upper and lower casing halves in which the reel is housed for rotation;
    means for fastening together the upper and lower casing halves; and
    a non-contact memory element provided in one corner portion of the lower casing half,
    wherein said means for fastening is positioned near the memory element and is formed of a non-magnetic material.

2. A magnetic tape cartridge as defined in claim 1 in which a tape draw-out opening is provided in a second corner portion of the cartridge casing, wherein said second corner portion is different from said first corner portion.

3. A magnetic tape cartridge as defined in claim 1 in which the memory element is a square plate-like member.

4. A magnetic tape cartridge as defined in claim 1 in which the memory element is held at about 45° to the bottom surface of the cartridge casing.

5. A magnetic tape cartridge as defined in any one of claims 1 to 4 in which the upper and lower casing halves are formed of a non-magnetic material.

6. A magnetic tape cartridge as defined in claim 5 in which the fastener means near the non-contact memory element comprises a screw formed of a hard plastic material and a boss which is formed on the upper or lower casing half and in which a sleeve of a soft plastic material is fitted so that a front end portion of the screw is screwed into the sleeve in a self-tapping fashion.

7. A magnetic tape cartridge as defined in claim 6 in which the outer surface of the sleeve and the inner surface of the boss facing each other at the interface therebetween are serrated.

8. A magnetic tape cartridge as defined in claim 6 in which the fastener means near the non-contact memory element comprises bosses which are formed respectively on the top wall of the upper casing half to extend downward and on the bottom wall of the lower casing half to extend upward and are bonded together at their ends by adhesive or welding.

9. A magnetic tape cartridge as defined in claim 6 in which the fastener means near the non-contact memory element doubles as the memory element holding means in the lower casing half.

10. A magnetic tape cartridge as defined in claim 6 in which the fastener means near the non-contact memory element comprises a pair of resilient engagement pieces which are formed on the inner side of the side wall of the upper casing half to extend inward downward laterally spaced from each other and are adapted to be engaged with the inner side of the side wall of the lower casing half, and the memory element is held by the resilient engagement pieces.

11. A magnetic tape cartridge as defined in claim 1, wherein the lower casing half includes a lower casing half shell portion and a lower casing half support portion, wherein the upper casing half includes an upper casing half shell portion and an upper casing half support portion, wherein the lower and upper casing half shell portions define an interior chamber within which the single reel is disposed, and wherein the lower and upper casing half support portions respectively extend from the lower and upper casing half shell portions into the interior chamber to hold the non-contact memory element at substantially a 45 degree angle from a bottom surface plane defined by the lower casing half shell portion.

12. A magnetic tape cartridge, comprising:

a single reel of magnetic tape;

a memory element;

a first casing part and a second casing part; and a set of fasteners which fastens the first and second casing parts together to form a cartridge casing which (i) has a substantially rectangular shape, (ii) houses the single reel of magnetic tape, and (iii) positions the memory element at substantially a 45 degree angle from a bottom surface plane defined by the first casing part, wherein the set of fasteners includes a fastener, which fastens the first and second casing parts together and which is disposed adjacent to the memory element, and wherein the fastener is formed substantially of non-magnetic material to avoid interfering with operation of the memory element.

13. A magnetic tape cartridge as defined in claim 12, wherein the fastener is a non-magnetic screw which extends through one of the first and second casing parts into the other of the first and second casing parts to hold the first and second casing parts together.

14. A magnetic tape cartridge as defined in claim 12, wherein the first casing part includes a first shell portion and a first support portion, wherein the second casing part includes a second shell portion and a second support portion, wherein the first and second shell portions define an interior chamber within which the single reel of magnetic tape is disposed, and wherein the first and second support portions respectively extend from the first and second shell portions into the interior chamber to position the non-contact memory element at substantially the 45 degree angle from the bottom surface plane defined by the first casing part.

* * * * *